Patented Feb. 3, 1942

2,272,012

UNITED STATES PATENT OFFICE 2,272,012

NITROGENOUS CONDENSATION PRODUCTS

Walter Kern, Sissach, and Richard Tobler, Riehen, Switzerland, assignors to Society of Chemical Industry in Basle, Basel, Switzerland No Drawing. Application June 18, 1938, Serial No. 214,580. In Switzerland June 21, 1937

7 Claims. (Cl. 260—316)

This invention relates to the manufacture of nitrogenous condensation products by the action of a condensing agent on a compound of the general formula $$(R_1—NH—)_n—R_2$$

wherein $R_1$ is a radical containing a group capable of being vatted, $R_2$ is a chrysene radical and $n$ is at least the number 1, and wherein at least one of each of the carbon atoms capable of being substituted of at least one radical $R_1$ and of the chrysene radical $R_2$ which are adjacent to the imino-group connecting the radicals $R_1$ and $R_2$ contains attached hydrogen.

The products of the above formula serving as parent material for the invention may be obtained, for example, by the reaction of a halogen substitution product of chrysene, for instance 2-bromo-, 2:8-dibromo- or 2:8-dichlorochrysenes, which may contain other substituents, for instance the nitro-group, besides halogen, with various compounds which contain at least one hydrogen atom attached to nitrogen and a group capable of being vatted; for this reaction there may be used, if desired, for 1 mol of a chrysene containing more than one halogen atom more than one mol of the same or different compound of the kind named, and the reaction between these mols may be simultaneous or successive. Compounds which contain at least one hydrogen atom attached to nitrogen, as well as a group capable of being vatted, for instance at least one cyclic bound carbonyl group, may be anthraquinone derivatives or may belong to more highly condensed ring systems; such compounds are, for instance, amino-anthraquinones, for example 1-amino-anthraquinone, and 1-aminoarylamino-anthraquinones; especially aminoacylamino-anthraquinones, wherein the acyl residue may be the residue of any acid, for instance an aliphatic, aromatic, aliphatic-aromatic or heterocyclic acid, for example carboxylic acids, such as 1-amino - 4 - benzoylamino - anthraquinones, 1-amino - 5 - benzoylamino - anthraquinones, 1-amino - 5 - benzoylamino - 8 - methoxy - anthraquinones, 1 - amino - 5:8 - dibenzoylaminoanthraquinones, 1 - amino - 5 - acetylamino - anthraquinone, 1 - amino - 5 - cinnamoylaminoanthraquinones, 1 - amino - 5 - pyridoylaminoanthraquinones and 1-amino-anthraquinonoyl-amino-anthraquinones; further aminodibenzanthrones, aminodianthrones, amino - anthanthrones, amino-N-dihydro-anthraquinone-azines, amino - anthraquinone - azines, aminodibenzpyrene - quinones, amino - flavanthrones and aminopyranthrones and amino-anthraquinone derivatives of which the 1- and 9-positions are members of a heterocyclic ring, such as amino-1:9 - anthrapyrimidines, amino - 1:9 - anthrapyridones, amino - 1:9 -isothiazole - anthrones and amino - 1:9 - pyrazole - anthrones; finally amino-anthraquinone derivatives in which two carbon atoms in ortho-position to each other are members of a heterocyclic ring system, as for instance is the case in the amino-anthraquinone-acridones. In addition to the above named amino-acylamino-anthraquinones there may be used such amino-acylamino-anthraquinones, the acyl radical of which represents the radical of propionic acid, butyric acid, stearic acid, phenyl-acetic acid, oxalic acid, succinic acid, halogen-benzoic acids, alkoxybenzoic acids, alkylbenzoic acids, naphthalene carboxylic acids, phthalic acids and quinoline carboxylic acids. All these compounds may contain further substituents. The parent materials for this invention are advantageously obtained by heating the components together in a solvent or diluent, for instance nitrobenzene, chloronaphthalene, dichlorobenzene, trichlorobenzene or amyl alcohol, in an open vessel or under pressure, and advantageously in the presence of a catalyst, for instance copper or copper compound, as well as in the presence of an acid binding agent, for instance alkali carbonate and/or anhydrous sodium acetate. If desired, the parent material for the invention may be obtained by the reaction of an aminochrysene with a halogenated compound containing a group capable of being vatted; this is the case, for example, when one uses 1-halogen-4-amino-anthraquinone containing in ortho-position to the amino-group an acid group, for instance a sulfonic group, and an aminochrysenesulfonic acid; such reactions may be produced in aqueous alcoholic media.

The condensing agent, which may have an oxidizing action, for instance aluminium chloride, may be caused to act at a high temperature or at a low temperature, and if desired in the presence of an organic acid chloride and a diluent or solvent. Sulfuric acid and its derivatives are especially suitable condensing agents. Those products of reaction react very easily which contain in the residues containing groups capable of being vatted an acylated amino-group, for instance an acetylamino-, a benzoylamino-, a pyridoylamino, a cinnamoylamino- or an anthraquinonoylamino-group. When these amines are used, especially valuable vat dyestuffs are produced. It is highly probable that by the action of a condensing agent a carbazole ring is produced.

A modification of the invention consists in causing the product obtainable by the action of a condensing agent to react with an amine containing a group capable of being vatted, which amine may be the same as that previously used and exemplified above. For this reaction there are especially suitable products which contain in the chrysene radical other groups capable of

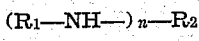

exchange, for example halogen. The products obtained by this reaction with an amine may, if desired, be again treated with a condensing agent, whereby very probably a further formation of the carbazole ring occurs. This treatment may be of the same kind as that described above and the condensing agent may also be one that has previously been named, for instance sulfuric acid or a derivative thereof.

The new products may be purified by a single or several crystallizations from organic solvents or by conversion into their salts with strong acids or by treatment with oxidizing agents, for example with an alkali nitrite solution in an acid medium, an alkali hypochlorite solution or a perborate solution. They may be treated in known manner with halogenating agents or converted into their leuco-derivatives, for example into the leuco-sulfuric acid esters.

The products of the invention are in part valuable intermediate products and in part dyestuffs; the latter may be used, for example, for dyeing and printing vegetable and animal fibres, for instance cotton, artificial silk, wool and natural silk. The dyeings and prints obtained are of very good fastness, especially to washing, chlorine, bowking and light.

The following examples illustrate the invention the parts being by weight.

*Example 1*

12 parts of di - (1' - anthraquinonyl) - 2:8-diaminochrysene obtained as described in Example 1 of specification Serial No. 214,572 filed April 18, 1938, from 1 mol dibromochrysene and 2 mols 1-amino-anthraquinone are introduced into 200 parts of concentrated sulfuric acid, whereupon the temperature is raised to 50–60° C. and stirring is continued for 16 hours. After cooling the mass is introduced into ice, filtered and the solid matter washed and dried. The dyestuff obtained in excellent yield is a red-brown powder soluble in concentrated sulfuric acid to a red-brown solution and dyeing cotton fast red tints in a blue-violet vat.

*Example 2*

1.5 parts of the condensation product made as described in Example 2 of specification Serial No. 214,572 filed June 18, 1938, from 1 mol of 2-bromochrysene and 1 mol of 1-amino-anthraquinone are introduced into 27 parts of concentrated sulfuric acid and the mixture is stirred for 16 hours at a temperature of 20–30° C. The mass is then introduced into ice and filtered with suction. The yellow precipitate is dissolved with aid of heat in dilute caustic soda solution and the solution is filtered from impurities and the dyestuff is salted out with common salt. The yellow powder obtained is soluble in concentrated sulfuric acid to an olive color, is soluble in water and dyes wool in an acid bath powerful pure and fast orange tints.

The same dyestuff is obtained when the condensation product is stirred with concentrated sulfuric acid at 50–60° C.

*Example 3*

1.5 parts of the condensation product obtained as described in Example 3, paragraph 1, of specification Serial No. 214,572 filed June 18, 1938, from 1 mol 2-bromochrysene and 1 mol 1-amino-4-benzoyl-aminoanthraquinone, are introduced into 27 parts of concentrated sulfuric acid and the mixture is stirred for 16 hours at a temperature of 50–60° C. The mass is then stirred into ice, filtered and the solid matter dissolved in hot water; this solution is filtered and the dyestuff salted out with common salt. It is a red-brown powder which dyes wool brown-red tints.

A similar dyestuff is obtained if the condensation product used in the first paragraph of this example is stirred with concentrated sulfuric acid at 20–30° C.

*Example 4*

4 parts of di-(4'-benzoylamino-1'-anthraquinonyl) - 2:8 - diaminochrysene, obtained as described in Example 4 of specification Serial No. 214,572, filed June 18, 1938, are stirred at 0–5° C. into 72 parts of sulfuric acid of 96.4 per cent strength, and stirring is continued for 21 hours at 0–5° C. The mass is now introduced into ice, about 0.8 part of sodium nitrite is added and the whole is stirred strongly for an hour. After this period the reaction is finished and the dyestuff which is obtained in excellent yield may be filtered, washed and dried. It is a brown-black powder soluble in concentrated sulfuric acid to a blue-green to violet solution and dyeing cotton very fast reddish brown tints in a red-orange vat. Analysis shows that the dyestuff has a content of 1.2 per cent of sulfur.

A like dyestuff is obtained if, instead of sodium nitrite, sodium perborate or sodium hypochlorite is used.

A further like dyestuff dyeing cotton a more brown tint is obtained when the blue reaction product of Example 4 of specification Serial No. 214,572, filed June 18, 1938, is treated with chlorosulfonic acid.

*Example 5*

3 parts of di-(4'-benzoylamino-1'-anthraquinonyl)-2:8 - di - aminochrysene, obtained as described in Example 4 of specification Serial No. 214,572 filed June 18, 1938, are introduced into 30 parts of sulfuric acid of 90 per cent strength and the mixture is stirred for 18 hours at 16–22° C. To finish the formation of dyestuff the mixture is introduced into ice, mixed with some sodium nitrite and the mass is strongly stirred for 4 hours and then filtered, the solid matter being washed and dried. This dyestuff is a brown-black powder of the formula

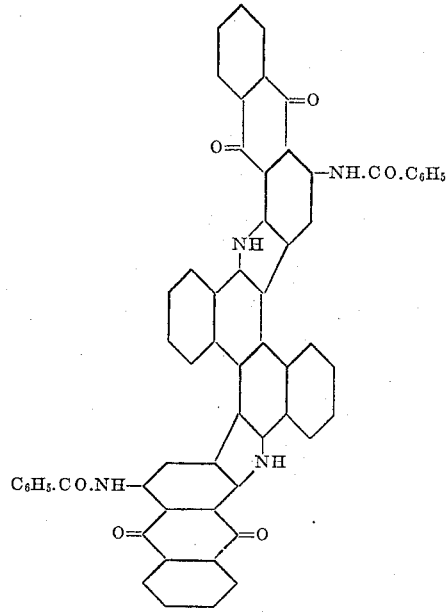

which dyes cotton reddish brown tints in a red-orange vat, the dyeings being characterized by fastness to soda boil, chlorine and light. The dyestuff is practically free from sulfur, analysis showing less than 0.2 per cent of sulfur.

*Example 6*

To 27.5 parts of acetyl chloride are added at 10-20° C. 15 parts of aluminium chloride and then 3 parts of the product obtained as described in Example 4 of specification Serial No. 214,572 filed June 18, 1938. The whole is stirred for 6 hours at 15-30° C., whereupon the mass is introduced into ice. After filtering the solid matter is washed with water, to the first portions of which some sodium nitrite has been added. The dyestuff thus obtained is a brown powder soluble in concentrated sulfuric acid to a blue-green solution and dyeing cotton brown tints in a red-brown vat.

Instead of acetyl chloride, benzoyl chloride may be used.

A like dyestuff is obtained if the condensation is conducted in nitrobenzene by means of aluminium chloride.

*Example 7*

46 parts of di-(5'-benzoylamino-1'-anthraquinonyl)-2:8-diaminochrysene, made as described in Example 5 of specification Serial No. 214,572, filed June 18, 1938, are introduced at 0-6° C. into 442 parts of sulfuric acid of 96 per cent strength and the whole is stirred for 21 hours at 0-6° C. For completing the formation of dyestuff the mass is introduced into ice, to which 9 parts of sodium nitrite have been added, and the whole is stirred strongly for 21 hours. The solid matter is then filtered, washed and dried. This dyestuff which is obtained in very good yield, is a brown powder of the formula

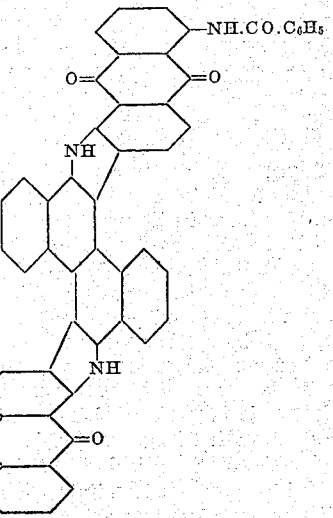

which colors concentrated sulfuric acid green and dyes cotton powerful pure yellow-brown tints in a red-yellow vat. Practically the same results are obtained irrespectively whether there is used for dyeing a strongly alkaline bath without addition of salt at about 50-60° C. or a medium alkaline bath with addition of salt at about 40-50° C. The fastness to washing, chlorine, soda boil and light are excellent. Analysis shows 0.65 per cent of sulfur in the dyestuff.

A like dyestuff is obtained if, instead of sodium nitrite, sodium hypochlorite or sodium perborate is used. By using sulfuric acid of a lower concentration or for a shorter period, a dyestuff containing less sulfur is produced.

*Example 8*

1.2 parts of di-(5'-benzoylamino-8'-methoxy-1'-anthraquinonyl)-2:8-diaminochrysene, obtained as described in Example 6 of specification Serial No. 214,572, filed June 18, 1938, are introduced at 0-5° C. into 36 parts of sulfuric acid of 96.2 per cent strength and the mixture is stirred at this temperature for 21 hours. For completing the formation of dyestuff the mass is introduced into ice to which some sodium nitrite has been added and this mixture is strongly stirred for 1¼ hours and then filtered, and the solid matter washed and dried. The dyestuff thus obtained is a red-brown to black powder of the formula

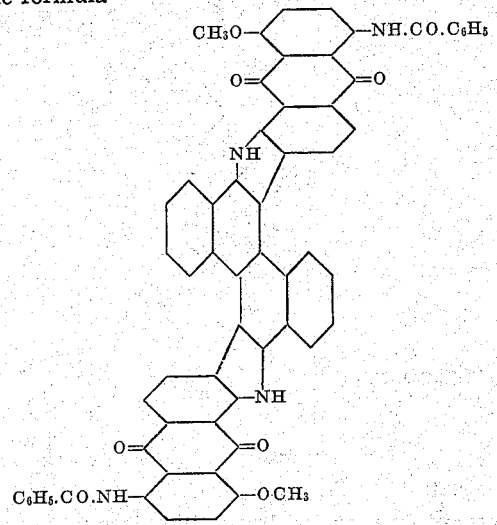

soluble in concentrated sulfuric acid to a green solution and dyeing cotton pure very fast red-brown tints in a yellow-red vat.

A like dyestuff is obtained when the condensation is carried out with sulfuric acid at a temperature of 10-22° C.

*Example 9*

2 parts of the product made as described in Example 8 of specification Serial No. 214,572, filed June 18, 1938, from 1 mol 2:8-dibromochrysene and 1 mol 1-amino-4-benzoylamino-anthraquinone are introduced at an internal temperature of 0-5° C. into 36 parts of sulfuric acid of 93 per cent strength, and the mixture is stirred for 21 hours at 0-5° C. The whole is then introduced into ice containing some sodium nitrite and strongly stirred for one hour. By this time the reaction is complete and the dyestuff of the formula

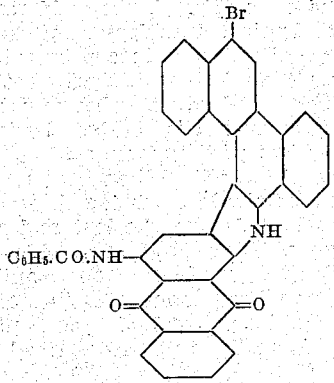

may be filtered, washed and made into a paste. It may be dissolved to form a yellow-red vat which dyes cotton fast red-brown-violet tints.

*Example 10*

2 parts of the product from 1 mol 2:8-dibromochrysene, 1 mol 1-amino-4-benzoylamino-anthraquinone and 1 mol 1-amino-5-benzoylaminoanthraquinone, made as described in Example 9 of specification Serial No. 214,572, filed June 18, 1938, are introduced into 36 parts of sulfuric acid of 93 per cent strength and the mixture is stirred for 16 hours at 15–22° C. To finish the formation of dyestuff the mass is introduced into ice containing some sodium nitrite and then strongly stirred for 1½ hours. The solid matter is filtered, washed and made into a paste. This dyestuff of the formula

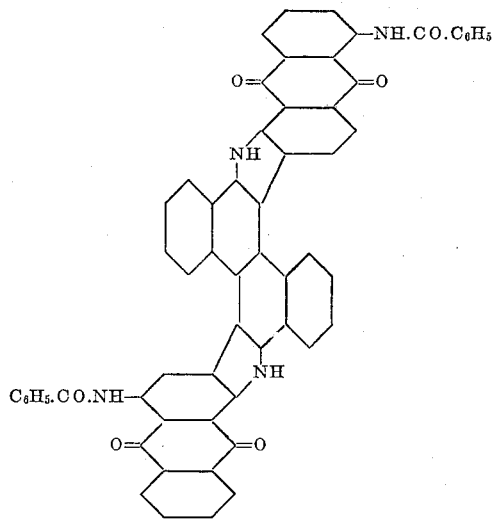

dyes cotton very fast brown tints in a yellow-red vat.

A very similar dyestuff is obtained when for the treatment with sulfuric acid a product is used which has been made by the simultaneous reaction of 1 mol 2:8-dibromochrysene with 1 mol 1-amino-4-benzoylamino-anthraquinone and 1 mol 1-amino-5-benzoyl-aminoanthraquinone.

Example 11

2 parts of the product from tetrabromochrysene and 1-amino-4-benzoylamino-anthraquinone, obtained as described in the first paragraph of Example 10 of specification Serial No. 214,572 filed June 18, 1938, are introduced into 36 parts of sulfuric acid of 96 per cent strength at 12–20° C. and stirred for 16 hours at this temperature. For completing the formation of dyestuff the mass is introduced into ice mixed with a little sodium nitrite and the mixture is stirred for 2 hours and then filtered, the solid matter being washed and dried. The dyestuff thus obtained is a black powder soluble in concentrated sulfuric acid to a green solution and dyeing cotton brown-violet-black tints in a violet-brown vat.

The same dyestuff is obtained by treating the parent product with sulfuric acid of 93 per cent strength at 15–37° C. When the parent product has been made by brominating chrysene of melting point 345° C. (see the last and second last paragraph of Example 10 of specification Serial No. 214,572 filed June 18, 1938, and 1-amino-4-benzoylamino-anthraquinone, the dyestuff obtained by treating the product with concentrated sulfuric acid is similar to that described in this example.

Example 12

2 parts of the product obtained from tetrabromochrysene and 1-amino-5-benzoylamino-anthraquinone, as described in paragraph 2 of Example 10 of specification Serial No. 214,572 filed June 18, 1938, are introduced into 36 parts of sulfuric acid of 96 per cent strength at 14–20° C. and the mixture is stirred at this temperature for 16 hours. To finish the formation of dyestuff the mass is poured into ice, mixed with a little sodium nitrite and stirred therein for 2 hours; the solid matter is then filtered, washed and dried. It is a black powder soluble in concentrated sulfuric acid to a green solution and dyeing cotton brown tints in a red-brown vat.

Example 13

Into 72 parts of sulfuric acid of 96 per cent strength 3 parts of bromine are added by drops at 0–5° C. There is then introduced at this temperature 2.7 parts of the dyestuff of Example 5 and stirring is continued for 3 hours. After further stirring for 16 hours at 20–25° C., the mixture is introduced into ice and the whole is filtered and the solid matter washed and dried. This dyestuff is a black powder soluble in concentrated sulfuric acid to a blue to blue-green solution and dyeing cotton fast brown tints in a yellow-red vat.

A similar dyestuff is obtained by conducting the bromination in nitrobenzene.

Example 14

10 parts of the product obtained as described in Example 11 of specification Serial No. 214,572 filed June 18, 1938, from 1 mol 2:8-dibromochrysene and 1 mol 1-amino-5-benzoylamino-anthraquinone are introduced at an internal temperature of 0–5° C. into 130 parts of sulfuric acid of 96 per cent strength, and the mixture is stirred for 16 hours at 0–5° C. It is now introduced into ice containing 3 parts of sodium nitrite and the whole is stirred strongly for 3 hours. After this period the reaction is complete and the dyestuff may be filtered, washed and dried. It is a brown-black powder soluble in concentrated sulfuric acid to a green-blue solution and dyeing cotton yellow-brown tints in a red vat.

2 parts of anhydrous sodium acetate and 2 parts of calcined sodium carbonate are added to 114 parts of nitrobenzene which is then boiled until 12 parts of nitrobenzene have been distilled. After cooling to about 193–203° C. there are added 6.45 parts of the dyestuff obtained as described in the last preceding paragraph. 3.5 parts of 1-amino-5-benzoylamino-anthraquinone and 0.2 part of cuprous chloride, and the whole is stirred at the last named temperature for 18 hours. The mixture is then filtered hot and the solid matter washed with nitrobenzene, benzene and alcohol and extracted with boiling dilute hydrochloric acid for purification; it is then filtered, washed with water and extracted with boiling alcohol. In this manner there is obtained a good yield of a dark brown powder which dissolves in concentrated sulfuric acid to a green solution. It melts at above 400° C. and dyes cotton brown tints in a red vat.

1.5 parts of the dyestuff thus obtained are introduced at an internal temperature of 0–6° C. into 27 parts of sulfuric acid of 96 per cent strength and the mixture is stirred for 18 hours at 0–6° C. It is now introduced into ice containing some sodium nitrite and the whole is stirred strongly for 6 hours at a temperature of 0–8° C. After this period the dyestuff may be filtered, washed and dried. It is identical with that obtained as described in Example 7 and correspondingly dyes cotton in a red-yellow vat strong yellow-brown tints of very good fastness to washing, chlorine, soda boil and light.

*Example 15*

2 parts of the product obtained as described in Example 13 of specification Serial No. 214,572 filed June 18, 1938, from 1 mol of 2:8-dibromochrysene and 2 mol 1-amino-5-(para-methoxy)-benzoylamino-anthraquinone are introduced at 0–6° C. into 36 parts of sulfuric acid of 96 per cent strength, and the mixture is stirred at this temperature for 18 hours. To finish the formation of dyestuff the whole is poured into ice which contains a little sodium nitrite and the mixture is stirred at 0–8° C., for 6 hours; the dyestuff thus produced is filtered, washed and dried. It is a dark powder of the formula

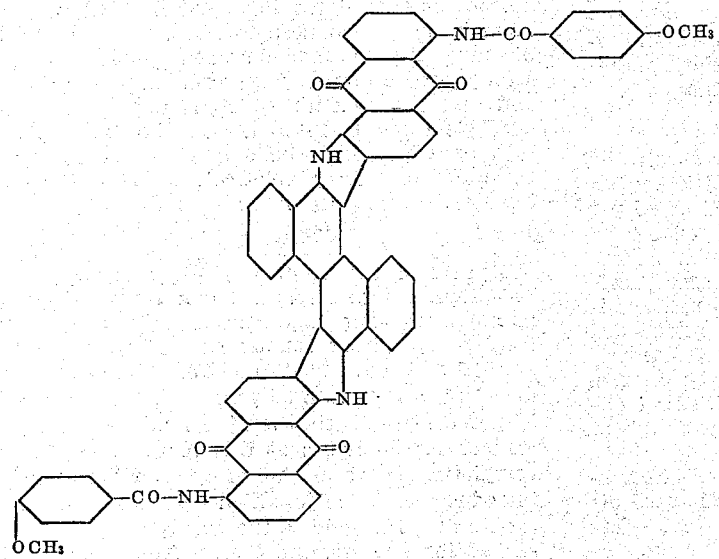

soluble in concentrated sulfuric acid to a green solution and dyeing cotton brown tints in a yellow-red vat.

*Example 16*

2 parts of the product made as described in the first paragraph of Example 14 of specification Serial No. 214,572 filed June 18, 1938, from 1 mol 2:8-dibromochrysene and 2 mol 1-amino-5-(para-chloro)-benzoylamino-anthraquinone are introduced at 0–6° C. into 36 parts of sulfuric acid of 96 per cent strength, and the whole is stirred for 18 hours at this temperature. To finish the formation of dyestuff the mass is poured into ice, mixed with a little sodium nitrite, and is stirred therewith for 6 hours at 0–8° C. The dyestuff thus obtained is filtered, washed and dried. It is a brown powder of the formula

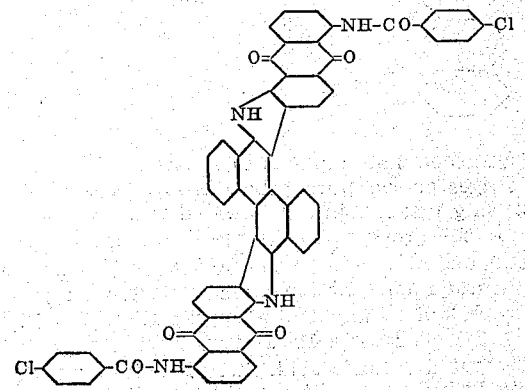

soluble in concentrated sulfuric acid to a blue-green solution and dyeing cotton brown tints in a yellow-red vat.

Similar dyestuffs are obtained when the condensation products from 1-amino-5-(ortho-chloro) - benzoylamino - anthraquinone or 1-amino-5-(meta-chloro) - benzoylamino - anthraquinone and 2:8-dibromochrysene are stirred with concentrated sulfuric acid and treated with nitrite.

*Example 17*

2 parts of the product obtained as described in Example 15 of specification Serial No. 214,517 filed June 18, 1938, from 1 mol 2:8-dibromochrysene and 2 mol 1-amino-5-acetylamino-anthraquinone are introduced at 0–6° C. into 36 parts of sulfuric acid of 96 per cent strength and the mixture is stirred for 18 hours at 0–6° C. It is then introduced into ice with addition of about 0.6 part of sodium nitrite and the whole is strongly stirred for 6 hours. The reaction is now complete and the dyestuff obtained in very good yield is filtered, washed and dried. It is a black-brown powder of the formula

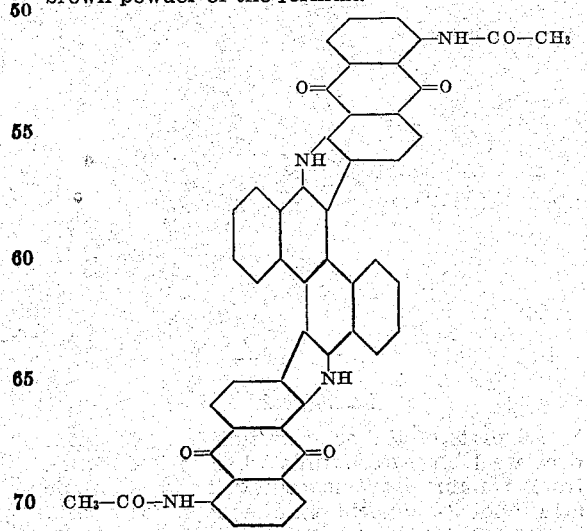

soluble in concentrated sulfuric acid to a green solution and dyeing cotton strong brown tints of excellent properties of fastness in a yellowish red vat.

Example 18

2.3 parts of di-(4'-benzoylamino-1'-anthraquinonyl)-2:8-diaminochrysene are introduced into 27 parts of sulfuric acid of 96 per cent strength at 0.6° C. and stirred therein for ½ hour. There is now added at the last named temperature a mixture of 1 part of nitrosylsulfuric acid of 50 per cent strength and 16 parts of sulfuric acid of 96 per cent strength in portions at the end of successive half hours over a period of 5 hours. To complete the reaction stirring is continued for ½ hour and the mass is introduced into ice and then filtered, the solid dyestuff being washed and made into a paste with water. The product corresponds with that obtained as described in paragraph 1 of Example 4.

If instead of di-(4'-benzoylamino-1'-anthraquinonyl)-2:8-diaminochrysene the di-(5'-benzoylamino-1'-anthroquinonyl)-2:8-diaminochrysene is used, there is obtained the dyestuff described in the first paragraph of Example 7.

Example 19

4 parts of di-(5'-benzoylamino-1'-anthraquinonyl)-2:8-diaminochrysene are introduced at 0-5° C. into 54 parts of sulfuric acid of 96 per cent strength, and the mass is stirred for 18 hours at 0-5° C. In the course of one hour there are now dropped in 1.4 parts of nitrosylsulfuric acid of 50 per cent strength and the mixture is stirred for a further hour and then introduced into ice and stirred for 2 hours. The reaction is then complete and the dyestuff may be filtered, washed and dried. It corresponds with that obtained as described in the second paragraph of Example 18.

If instead of di-(5'-benzoylamino-1'-anthraquinonyl)-2:8-diaminochrysene there is used di-\4'-benzoylamino-1'-anthraquinonyl) - 2:8 - diaminochrysene, there is obtained the dyestuff described in paragraph 1 of Example 4.

Example 20

1.85 parts of the condensation product which dyes wool blue-green tints when it is obtained from 1-amino-4-bromoanthraquinone-2-sulfonic acid and 2-aminochrysene-mono-sulfonic acid are introduced into 36 parts of concentrated sulfuric acid and stirred therein for 20 hours at the ordinary temperature, whereby the color of the sulfuric acid changes from blue to lilac. The mass is now introduced into ice and then filtered and the red-yellow solid matter dissolved in dilute sodium carbonate solution which is filtered from traces of impurities and mixed with common salt to salt out the dyestuff. This is a brown powder soluble in concentrated sulfuric acid to a red-violet solution and dyeing wool in an acid bath orange-yellow tints which are very fast.

The 2-aminochrysenesulfonic acid used in this example is made by sulfonating 2-aminochrysene.

Example 21

1 part of the product from 1 mol 2:8-dibromochrysene and 2 mol 5-amino-1:9-anthrapyrimidine, obtained as described in Example 16 of specification Serial No. 214,572 filed June 18, 1938, are introduced at 0–5° C. into 18 parts of sulfuric acid of 96 per cent strength, and the mixture is stirred for 16 hours at 0–5° C. The mass is then introduced into ice, about 0.4 part of sodium nitrite is added and the whole is stirred strongly for 5 hours. The reaction is now at an end and the dyestuff which is formed in very good yield may be filtered, washed and dried. It is a dark powder soluble in concentrated sulfuric acid to a dirty violet color and dyeing cotton brown fast tints in a brown vat.

Example 22

2 parts of the product obtained from 1 mol 2:8-dibromochrysene and 2 mol 1-amino-5-cinnamoylamino-anthraquinone, as described in the first paragraph of Example 18 of specification Serial No. 214,572 filed June 18, 1938, are introduced at 0–5° C. into 36 parts of sulfuric acid of 96 per cent strength, then the mixture is stirred further for 20 hours at this temperature. For completing the formation of dyestuff the mass is introduced into ice to which 0.6 part of sodium nitrite has been added, the whole being strongly stirred for 5 hours, and then filtered. The solid matter, which is the dyestuff of the formula

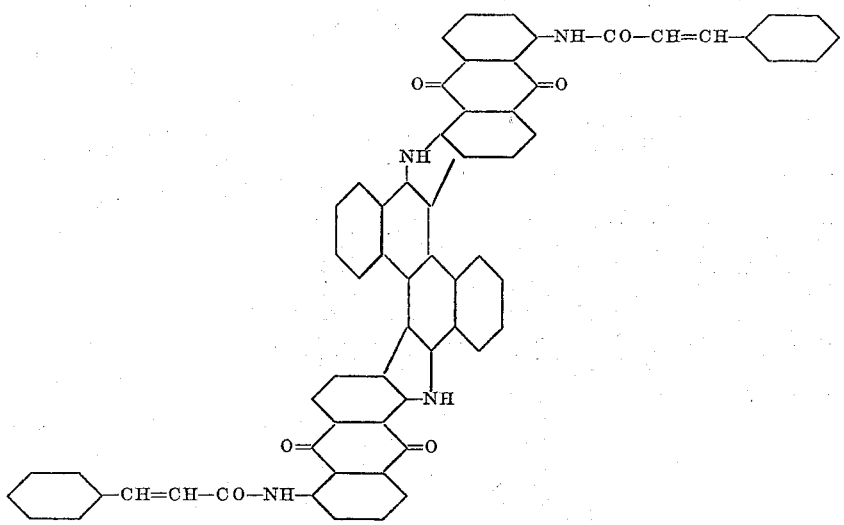

is washed and made into a paste with water. It dyes cotton pure yellow-brown tints of surprising fastness in a yellow-red vat.

If the product from 1 mol 2:8-dibromochrysene and 2 mol of 1-amino-5-β-pyridoylaminoanthraquinone obtained as indicated in paragraph 2 of Example 18 of specification Serial No. 214,572 filed June 18, 1938, is stirred with concentrated sulfuric acid, there is obtained a dyestuff which dyes cotton fast brown tints. So also the dyestuff obtained as described in the third paragraph of Example 18 of specification Serial No. 214,572 filed June 18, 1938, from 1 mol 2:8-dibromochrysene and 2 mol 1-amino-5-(2'-anthraquinonyl)-amino-anthraquinone yields when stirred with concentrated sulfuric acid a new valuable dyestuff. This dyes cotton pure brown tints of excellent fastness in a yellow-red vat.

*Example 23*

5 parts of the 5'-benzoylamino-1'-anthraquinonyl-2-aminochrysene, obtained as described in the second paragraph of Example 3 of specification Serial No. 214,572 filed June 18, 1938, are introduced at 10-15° C. into 80 parts of sulfuric acid of 90 per cent strength and the mixture is stirred at the said temperature for 18 hours. The mass is now introduced into ice containing some sodium nitrite and the whole is stirred strongly for 6 hours and then filtered, the solid dyestuff being washed and dried. It is a brown powder which colors strong sulfuric acid green-blue and dyes cotton red-brown tints in a red vat.

A similar cotton dyestuff of a more yellow-brown tint is obtained by stirring into concentrated sulfuric acid at 0-5° C. the product obtained as described in paragraph 3 of Example 3 of specification Serial No. 214,572, filed June 18, 1938, from 1 mol of 2-bromo-8-nitrochrysene and 1 mol of 1-amino-5-benzoylamino-anthraquinone.

*Example 24*

1 part of the product from 1 mol 2:8-dibromochrysene, 1 mol 1-amino-4-benzoylamino-anthraquinone and 1 mol 4-amino-2-(N)1-benzanthraquinone-acridone, obtained as described in Example 21 of specification Serial No. 214,572 filed June 18, 1938, are introduced at 0-5° C. into 18 parts of sulfuric acid of 96 per cent strength, and the mixture is stirred at this temperature for 18 hours. To finish the formation of dyestuff the mass is then poured into ice containing some sodium nitrite and the whole is stirred strongly for 5 hours, whereupon the dyestuff is filtered, washed and dried. It is a dark powder which dissolves in concentrated sulfuric acid to a green solution and dyes cotton violet-grey-black tints in a red-brown vat.

*Example 25*

3.25 parts of the product obtained by treating as described in Example 9 with concentrated sulfuric acid the product from 1 mol 2:8-dibromochrysene and 1 mol 1-amino-4-benzoylamino-anthraquinone are suspended together with 0.8 part of anhydrous sodium acetate, 0.8 part of calcined sodium carbonate, 1.4 parts of 5-amino-1:9-anthrapyrimidine and 0.1 part of cuprous chloride in 72 parts of dry nitrobenzene and the mixture is stirred for 24 hours at a temperature of 196-206° C. The mixture is then filtered hot and the solid matter is washed with nitrobenzene and benzene and extracted with boiling hydrochloric acid of 1 per cent strength for purification. There is obtained in good yield a brown-black powder which colors concentrated sulfuric acid green and dyes cotton brown-violet tints in a yellow-red vat.

1 part of the product made as described in the last preceding paragraph is introduced into 15 parts of concentrated sulfuric acid at 0-5° C. and the mixture is stirred for 16 hours at this temperature. It is then introduced into ice, some sodium nitrite is added and stirring is resumed for 5 hours. The reaction is now complete and the dyestuff which is obtained in excellent yield may be filtered, washed and dried. It is a black powder soluble in concentrated sulfuric acid to a dirty blue solution and dyeing cotton red-brown tints in a yellow-red vat.

If the product from 1 mol of 2:8-dibromochrysene and 1 mol 1-amino-5-benzoylamino-anthraquinone is condensed with 4-amino-1:9-anthrapyrimidine in nitrobenzene in the aforesaid manner and the condensation product thus obtained is stirred with concentrated sulfuric acid, there is produced a dyestuff which dyes cotton fast yellow-brown tints in a red-brown vat.

*Example 26*

3.25 parts of (5'-benzoylamino-1'-anthraquinonyl)-2-amino-8-bromochrysene, 1.5 parts of 4-amino-N-methyl-1:9-anthrapyridone, 0.8 part of calcined sodium carbonate, 0.8 part of anhydrous sodium acetate and 0.2 part of cuprous chloride are suspended in 60 parts of dry nitrobenzene, and the mixture is stirred for 24 hours at a temperature of 196-206° C. The mixture is then filtered hot and the solid matter washed with benzene and alcohol and then extracted with boiling dilute hydrochloric acid to remove copper compounds. The product obtained in good yield is a blue-grey crystalline powder soluble in concentrated sulfuric acid to a violet-brown solution; it melts at above 460° C. and can be vatted only with difficulty.

1 part of the product obtained as described in the last preceding paragraph is introduced at 0-5° C. into 20 parts of sulfuric acid of 96 per cent strength, the mixture is stirred for 16 hours at 0-5° C., the mass is introduced into ice, about 0.3 part of sodium nitrite is added and the whole is stirred strongly for 5 hours. Reaction is now complete and there is obtained in excellent yield a dyestuff which may be filtered, washed and made into a paste. It dyes cotton fast brown tints in a yellow-red vat.

A similar dyestuff is obtained if the condensation product from 1 mol of 2:8-dibromochrysene, 1 mol of 1-amino-5-benzoyl-amino-anthraquinone is treated with concentrated sulfuric acid in the manner described and condensed with 4-amino-N-methyl-1:9-anthrapyridone.

If one condenses 1 mol of (4'-benzoylamino-1'-anthraquinonyl)-2-amino-8-bromochrysene in the usual manner with 4-amino-N-methyl-1:9-anthrapyridone, there are obtained in very good yield violet needles which dissolve in concentrated sulfuric acid to a brown solution and melt above 460° C. When this body is stirred, as described in paragraph 2 of this example, with concentrated sulfuric acid, there is obtained a dyestuff which dyes cotton violet-brown fast tints in a yellow-red vat.

*Example 27*

6.5 parts of (4-benzoylamino-1'-anthraquinonyl)-2-amino-8-bromochrysene, 2.7 parts of 5-amino-iso-thiazole-anthrone, 1.5 parts of anhydrous sodium acetate, 1.5 parts of calcined sodium carbonate and 0.15 part of cuprous chloride are suspended in 108 parts of dry nitrobenzene and the whole is stirred for 24 hours at a temperature of 196-206° C. It is then filtered hot, the solid matter washed and, for removal of copper compounds, extracted with boiling dilute hydrochloric acid. It is then filtered, washed and extracted with alcohol. This product, obtained in very good yield, is a violet powder soluble in concentrated sulfuric acid to a brown-olive solution and vatted with difficulty. Analysis shows it to be a condensation product from 1 mol (4'-benzoylamino - 1' - anthraquinonyl)-2-amino-8-bromochrysene and 1 mol of 5-amino-isothiazole-anthrone.

2 parts of this condensation product are introduced at 0–5° C. into 36 parts of sulfuric acid of 96 per cent strength and the mixture is stirred for 16 hours at 0–5° C. The whole is then introduced into ice, 0.6 part of sodium nitrite is added and the mass is stirred strongly for 5 hours. The reaction is then finished and there is obtained in very good yield a dyestuff which is filtered, washed and dried. It is a dark powder soluble in concentrated sulfuric acid to a grey-green solution and dyeing cotton fast red-brown tints in a yellow-red vat.

If the product from 1 mol of dibromochrysene and 1 mol of 1-amino-5-benzoylamino-anthraquinone, which has been treated with concentrated sulfuric acid, is condensed with 5-amino-iso-thiazole-anthrone, there is obtained a dyestuff which dyes cotton yellow-brown tints in a red-brown-yellow vat.

What we claim is:

1. Nitrogenous condensation products, containing the grouping

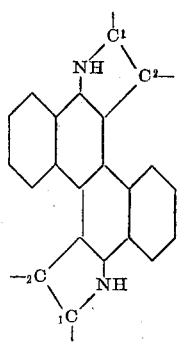

wherein the carbon atom pairs $C_1C_2$ each belong to an anthraquinone radical containing an α-acyl amino group.

2. Nitrogenous condensation products of the formula

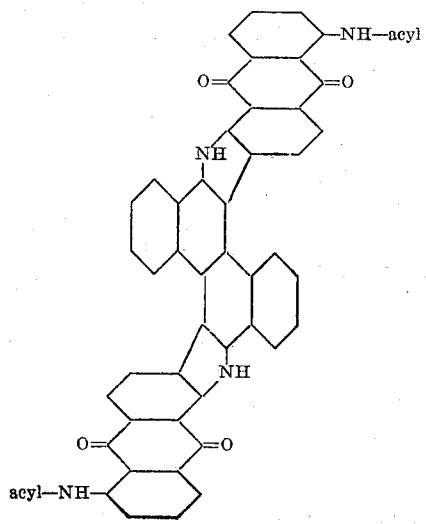

3. Nitrogenous condensation products of the formula

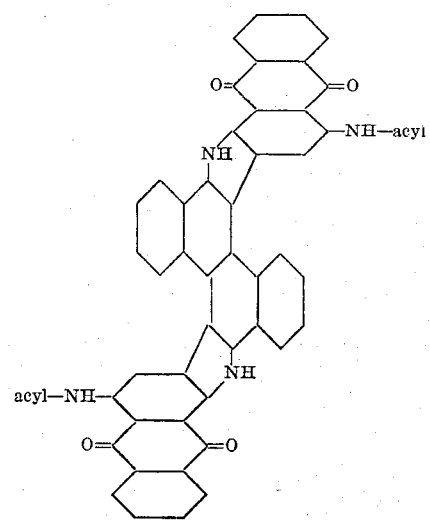

4. Nitrogenous condensation products, characterized by the grouping

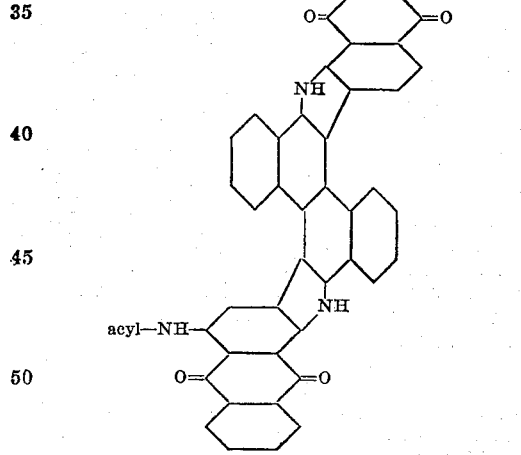

5. The nitrogenous condensation product of the formula

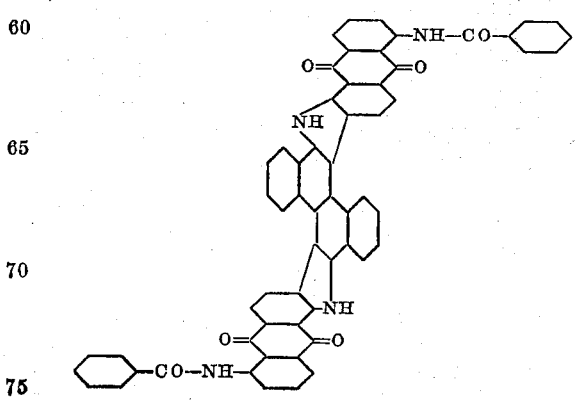

6. The nitrogenous condensation product of the formula
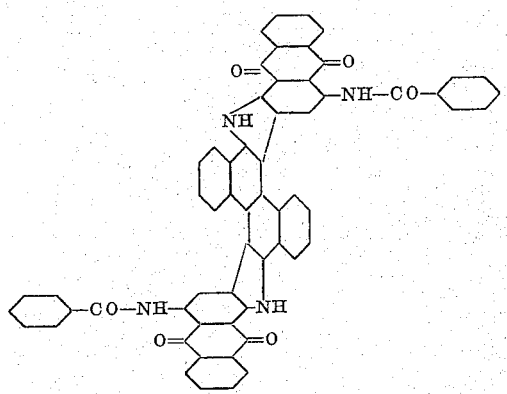
7. The nitrogenous condensation product of the formula
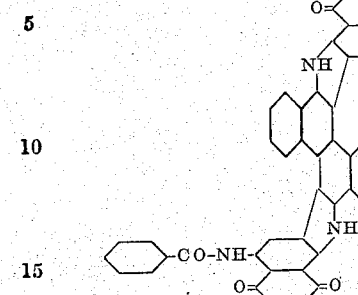
WALTER KERN.
RICHARD TOBLER.